UNITED STATES PATENT OFFICE.

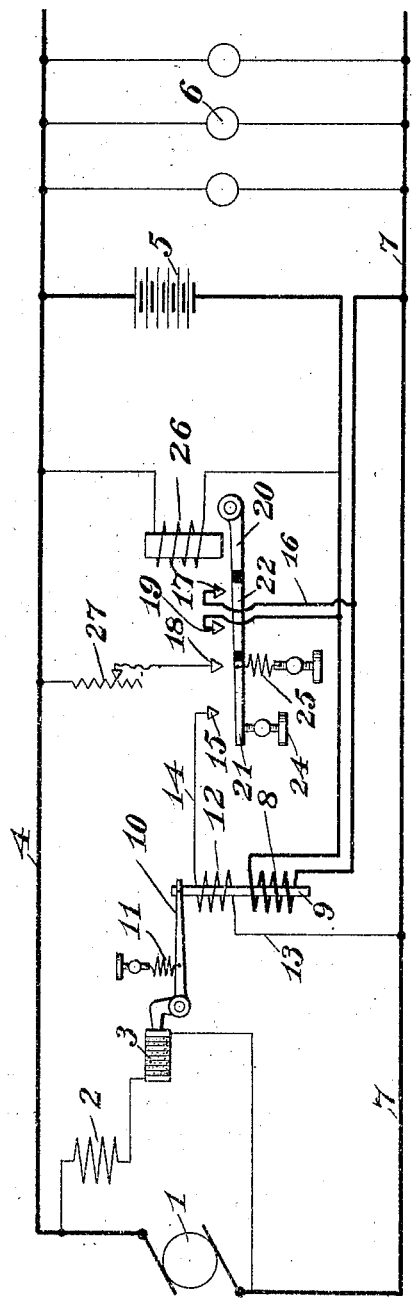

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,008,294.     Specification of Letters Patent.     Patented Nov. 7, 1911.

Original application filed November 21, 1910, Serial No. 593,319. Divided and this application filed June 10, 1911. Serial No. 632,480½.

*To all whom it may concern:*

Be it known that I, JOHN L. CREVELING, a resident of the city, county, and State of New York, have invented certain new and useful Improvements in Electric Regulation, as set forth in the annexed specification and drawing, forming a part thereof.

My invention pertains to that class of electric regulation wherein it is desired to automatically regulate a dynamo or generator in a predetermined manner.

My invention has for its particular object to provide means whereby a dynamo or generator may be automatically governed or controlled in such manner as to properly charge a storage battery and operate lamps or translating devices.

This application is a division of my application for improvement in electric regulation, No. 593,319, filed November 21, 1910.

The drawing is a diagrammatic representation of one type of system embodying the essentials of my invention.

In the drawing, 1 represents a dynamo or generator provided with the usual field coil 2 having in series therewith a regulating element in this instance indicated as a carbon pile 3.

4 represents the positive lead of the generator which is connected with one side of the storage battery 5 and one side of the lamps or other translating devices indicated at 6. The remaining terminals of the translating devices are carried to the lead 7 which connects with the negative brush of the generator. The negative side of the storage battery 5 is connected with the lead 7 through the coil 8. The coil 8 surrounds the core 9 of magnetic material, in such manner that when energized, it tends to draw the same in a downward direction. The core 9 is carried by the bell crank lever 10, normally drawn in an upward direction as by the adjustable spring 11 in such manner as to tend to compress the carbon pile 3 and lower the resistance thereof.

12 is a coil of fine wire surrounding the core 9 and having one of its ends connected with the lead 7 as by wire 13 and the other end connected as by wire 14 with the switch contact 15.

16 is a coarse wire carried from a point in the wire connecting the battery 5 with the lead 7 between the lead 7 and the coil 8 to the switch contact 17. Switch contact 19 is connected with the wire connecting the battery 5 with the lead 7 at a point between the battery 5 and the coil 8.

18 is a switch contact connected with the lead 4 through the resistance 27.

20 is an armature provided with contacts 21 and 22 electrically insulated from each other and normally drawn in a downward direction against the adjustable stop 24 as by adjustable spring 25. The contacts 21 and 22 are so arranged that when lever 20 is raised they will cause electrical communication between 15 and 18 and between 17 and 19.

26 is an electro-magnet in shunt to the battery 5, which, when energized, tends to lift the lever 20.

27 is an adjustable resistance in series with the circuit containing the coil 12 whereby the current in said coil may be adjusted.

The operation of my invention when embodied in a system as herein shown for illustration is substantially as follows:— Starting with the generator charging the batteries which we will consider as below their normal voltage, current will flow from the generator, through the field 2 and carbon pile 3 in a well known manner and the voltage of the generator will depend upon the resistance of the carbon pile 3. Current will flow from the generator through lead 4, storage battery 5 coil 8 and translating devices 6 if they be in circuit and return to the generator through lead 7. I now so adjust the spring 11 that when the maximum current desired to have furnished to the battery by the generator is reached, the coil 8 will cause the core 9 to be drawn downwardly so as to increase the resistance 3 and thus regulate the generator voltage so that this maximum current will not be exceeded. If now, the generator continue to supply this current and thus charge the battery, the voltage upon the battery will gradually rise. This will cause a rise in current in the magnet 26 inasmuch as the same is in shunt across the circuit and I so adjust the spring 25 that when the maximum desired voltage across the battery, for example substantially its fully charged voltage, be reached, the coil 26 will lift the armature 20 against the action of spring 25 and close the contacts 15, 21, 18, and 17, 22, 19. This will shunt out the current regulating coil 8 and throw the voltage regulating coil 12 in circuit across the battery and generator. I now so adjust the adjustable resistance 27 that the current in the voltage coil 12, with the maximum desired voltage across the line will cause the coil 12 to exert a substantially equal pull upon the core 9 as did the coil 8 when the maximum current was flowing therethrough. Under these conditions, the voltage coil 12 will hold this maximum preferred voltage across the generator regardless of the current delivered by the generator. The batteries now charging across this constant voltage circuit will have their charging current gradually tapered off to zero as their voltage rises.

From the foregoing it will be plain that I have produced a system wherein the storage batteries may be automatically charged at a constant rate or under current control until a certain desired voltage is reached, when the current controlling feature is suppressed or rendered inoperative and the regulator becomes a voltage regulator charging the batteries on a constant voltage circuit.

I do not wish in any way to limit myself to the exact details of the system shown in the drawing submitted herewith as a mere diagrammatic representation of one type of system embodying my invention nor to the exact mode of operation outlined as a description of this diagrammatic system used for illustration merely, as it will be plain that wide departure in the way of details of construction and operation may be made without departing from the scope of my invention, which is as set forth in the following claims:—

1. The combination with a generator and a storage battery in circuit therewith, of a regulator responsive to fluctuations in current in the battery circuit; means for rendering said regulator responsive to fluctuations in voltage across the battery circuit and unresponsive to current changes in the battery circuit.

2. The combination with a generator and a storage battery in circuit therewith, of a regulator responsive to fluctuations in current in the battery circuit, means for rendering said regulator responsive to fluctuations in voltage across the battery circuit, and unresponsive to current changes in the battery circuit, and means for operating the first mentioned means responsive to voltage changes across the battery.

3. The combination with a generator, a supply circuit and a storage battery, of means for regulating the generator, comprising means responsive to current changes through the battery, means responsive to voltage changes, and automatic means for selecting which of said operating means shall be operative.

4. The combination with a generator, a supply circuit and a storage battery, of means for regulating the generator comprising means responsive to changes in current through said battery, means responsive to voltage changes, and automatic means for determining which of said responsive means shall control said regulating means.

5. The combination with a source of electromotive force, a supply circuit and a storage battery, of means for regulating said electromotive force, current operated means for controlling the regulating means responsive to fluctuations in current through the battery, voltage responsive means for controlling the regulating means, and automatic means for controlling the current in both of said operating means.

6. The combination with a source of electromotive force, a supply circuit and a storage battery, of means for regulating said electromotive force, current actuated means for controlling the regulating means responsive to the storage battery current, voltage operated means for controlling said regulating means, and voltage operated means for determining which of said controlling means governs said electromotive force.

7. The combination with a source of electromotive force, a storage battery and a supply circuit, of means for regulating said electromotive force, operating means for said regulating means responsive to fluctuations in current through the battery, operating means for said regulating means responsive to voltage fluctuations, and automatic means for determining which of said operating means shall predominate in the regulation of said electromotive force upon tendencies of the same to vary.

8. The combination with a source of electromotive force, a storage battery and a supply circuit, of means for regulating said electromotive force, operating means for said regulating means responsive to fluctuations in current through the battery, operating means for said regulating means responsive to voltage fluctuations, and voltage operated means for determining which of said operating means shall predominate in the regulation of said electromotive force upon tendencies of the same to vary.

9. The combination with a source of electromotive force, a supply circuit and storage battery, of means for regulating said electromotive force comprehending controlling means affected by current flowing through said battery and controlling means responsive to voltage fluctuations, and automatic means for determining which of said controlling means shall predominate in effecting the regulation of said electromotive force upon tendencies of the same to vary.

10. The combination with a generator, a supply circuit and storage battery, of means for regulating said generator comprehending controlling means responsive to current changes through the battery, and controlling means responsive to voltage changes of the generator and automatic means for determining which of said controlling means shall predominate in effecting the regulation of the generator upon variations in the operation thereof.

11. The combination with a source of electromotive force, a supply circuit and storage battery, of means for regulating said electromotive force responsive to a coil in shunt to the supply circuit and a coil in series with the battery and automatic means for controlling the operative relation of both coils with respect to each other.

12. The combination with a source of electromotive force, a supply circuit and a storage battery, of means for effecting battery current regulation of said electromotive force, means for effecting voltage regulation of said electromotive force, and supplemental means for automatically determining which of said before mentioned means shall regulate said electromotive force.

13. The combination with a generator, a supply circuit, a storage battery and a translation circuit, of means for regulating the generator comprehending regulation affecting means responsive to fluctuations in current through the battery independently of the translation circuit, regulation affecting means responsive to voltage fluctuations, and means for determining which of said regulation affecting means shall effect the regulation of the generator throughout changes in the operation thereof.

JOHN L. CREVELING.

Witnesses:
 ANNA MARIE WALL,
 MABEL E. HILLOCK.

Copies of this patent may be obtained for five cents each, by addressing the "Commissioner of Patents, Washington, D. C."